H. D. ABERNETHY.
MULTIPLE CONE CLUTCH.
APPLICATION FILED FEB. 5, 1916.
1,195,762.
Patented Aug. 22, 1916.
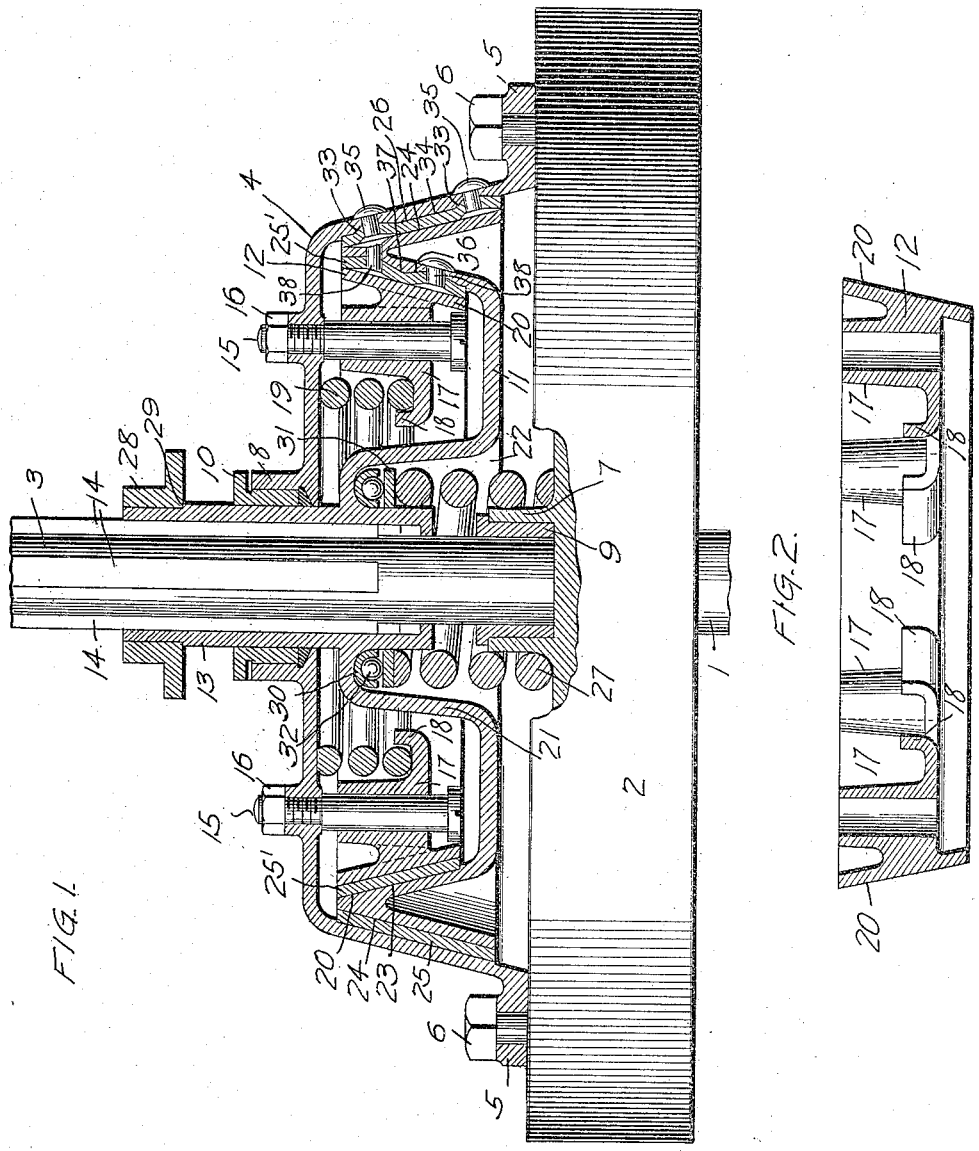
Witnesses
T. L. Cochrane
May M. Plyer.
Inventor
Harry D. Abernethy
By Jas. L. Skidmore
His Attorney.

UNITED STATES PATENT OFFICE.

HARRY D. ABERNETHY, OF CLEVELAND, OHIO, ASSIGNOR TO HARMON H. FULTON, OF CLEVELAND, OHIO.

MULTIPLE-CONE CLUTCH.

1,195,762.  Specification of Letters Patent.  Patented Aug. 22, 1916.

Application filed February 5, 1916. Serial No. 76,379.

*To all whom it may concern:*

Be it known that I, HARRY D. ABERNETHY, a citizen of the United States, residing at Cleveland, in the county of Cuyahoga and State of Ohio, have invented certain new and useful Improvements in Multiple-Cone Clutches, of which the following is a specification.

My invention relates to an improvement in the construction and operation of friction clutches, and has special reference to the cone friction clutch type.

The main object of this invention is to provide a multiple cone clutch of a simple, durable and efficient character, so that there will be both a gradual and yielding clutching and unclutching action of the clutch.

Another object of my invention is to provide cone friction members, in the clutch mechanism, which are spring controlled, said members being so arranged that the extent of friction surface in engagement gradually increases in the clutching operation and gradually decreases while unclutching.

A further object of the invention is to mount a plurality of cone friction members within a casing, and provide springs for actuating them into clutching position, the said springs being so located that one of the friction members will be forced upward while the other member is being forced in a downward direction.

The foregoing and such other objects as may occur from the ensuing description, are attained by the means hereinafter more fully described, and by the combination, construction, arrangement and location of the parts such as illustrated in the accompanying drawings and particularly set forth in claims appended hereto.

Reference now being had to the accompanying drawings which form a part of this specification and in which similar numerals of reference indicate like parts throughout the several views, it will be seen that: Figure 1, is a central longitudinal sectional view of the improved mechanism embodying my invention showing the clutching mechanism with all the parts in clutching condition, and Fig. 2, is a central longitudinal section of the inner single cone clutch located within the casing.

The mechanism shown to illustrate the invention has a main driving shaft 1 which may be the engine shaft, and a fly wheel 2 thereon. The remainder of the mechanism may be considered the clutch mechanism. There is a driven shaft 3 which extends loosely in the casing secured to the fly wheel. The casing is composed of a single annular member 4 and is provided at its base or lower portion with a series of radially extending flanges 5, each flange being provided with an opening for the reception of a bolt 6, by means of which the said casing 4 is rigidly secured to the side of the fly wheel. The fly wheel is provided at its hub portion with an inwardly extending thimble 7 which serves as a bearing for the inner end of the shaft 3, while there is a bearing sleeve 8 at the upper end portion of the casing surrounding the shaft 3. These bearings have bushings 9 and 10 in them.

Within the casing there are two annular cone friction members 11 and 12, the larger double cone member 11 having an elongated sleeve-like hub 13, which hub is secured to the shaft 3 by the splines 14, so that said friction member 11 may be moved longitudinally of the shaft, but turn therewith, while the smaller single cone friction member 12 is supported by the casing within the outer peripheral portion of the member 11, by a series of headed bolts 15, the body portion of each bolt passing through an opening formed at intervals around the member 12 within its perimeter, and the threaded end of each bolt passing through an opening formed at intervals through the upper portion of the casing, each bolt being secured to the casing by a fastening nut 16. The said member 12 is provided with a series of annularly arranged inwardly extending portions 17, each having an opening adapted to receive one of the headed bolts 15, and each provided at its inward terminal with an upward extension 18, which portions 17 are adapted to support the lower end of a spring 19 arranged between the inner walls of the portions 17 and extensions 18, the upper end of said spring resting in contact with the inner surface of the casing for the purpose hereinafter referred to, and the outer peripheral portion of the member 12 is provided with an annular cone face 20.

The inner annular wall 21 of the large friction member 11 forms a chamber 22, while on the outer peripheral V-shaped portion of said member is formed two annular cone faces 23 and 24, the outer face 24, being adapted to contact with any suitable friction material 25 secured to the annular cone face 26 formed by the inner surface of the casing, while the inner cone face 23, provided with a suitable friction material 25', contacts with the annular cone face 20 of the member 12.

There is a spiral spring 27 located within the chamber 22 between the large friction member and the fly wheel, and there is also the spiral spring 19, lying within the large friction member and between the small friction member 12 and the upper portion of the casing. The spring 27 is heavier and more powerful than the spring 19, therefore the spring 27 is not only strong enough to force the large friction member 11 with its two cone clutching faces into clutching position, but also the other member 12 with its cone face 20 into clutching position with the cone face 23 of the member 11.

A collar 28 is secured on the reduced outer end of the sleeve 13 to which collar the actuating lever is secured, and said collar bears against a shoulder 29 on the inside, so that through the actuating lever power may be employed to shift the sleeve 13 inward for unclutching purposes.

As shown in Fig. 1, it will be seen that the spring 27 tends normally to retain the clutch members in frictional engagement. When it is desired to disengage the clutch the sleeve 13, carrying the large friction member 11, will be moved forward or inward, the spring 27 being gradually compressed and the tension of spring 19 will be released. It will be perceived that when the sleeve 13 is shifted to unset the clutch the spring 19 is at first allowed to expand and the spring 27 compressed until the surface of each portion 17 of the inner friction member 12, contacts with the headed end of each bolt 15, thereby serving to stop any further inward movement of said member 12, and thus limits any further expansion of the spring 19. When the sleeve 13 is permitted to move outwardly or rearwardly the friction material 25 and 25' will engage the cone faces 24 and 20 of the friction members 11 and 12, but instead of the usual abrupt engagement the inward pressure exerted by the spring 19, due to its location between the casing and the member 12, will cause the cone faces to engage with each other, at first very gradually and thus with a very slight pressure. This pressure depending entirely upon the strength of the spring 19, gradually increases, when it will be seen that the full tension of the spring 27 will be employed to retain the clutch members in engagement with each other. It will thus be seen that when the clutch is being set the spring 27 is allowed to expand and the spring 19 will be gradually compressed until the friction faces of the clutch engage with each other in the manner shown. It will be readily perceived that by the use of this novel mechanism the sudden shock and jar which usually occurs when the clutch members first engage with each other is entirely avoided, as the bearing surfaces approach each other very gradually at first, owing to the fact that the spring 27 which tends to always automatically hold the clutch members in engagement must first overcome the tension of the spring 19 before said clutch members are locked in engagement.

Since the shaft 3 and the friction member 11 do not always rotate with the casing, and the strong spring 27 will rotate with the casing, it is necessary to have an easy bearing between the friction member 11 and said spring. This bearing consists of an annular steel ball race 30 located within the chamber 22 and surrounding the lower portion of the sleeve-like hub 13, and an annular plate 31, against which the upper end of the spring 27 bears, and bearing balls 32 supported by said plate 31 within the ball race 30.

It will be seen that the annular inner cone face of the casing is provided at intervals with elongated depressions or recesses 33, thereby forming thickened inward projecting portions 34 around said cone face, so that when the friction material is riveted thereto by the rivets 35 the friction material will project inwardly and unevenly at various points around the face of the cone thereby forming an uneven roughened contact surface and insuring a more perfect binding engagement of the cone contact faces with each other, while the inner cone face 23 of the member 11 is provided with corresponding depressions or recesses 36 and thickened projecting portions 37, the friction material 25' being riveted thereto by rivets 38 thereby forming a roughened contact surface for the purpose before referred to.

It will be understood that the friction material or binding element may be made of leather, rubber, or any suitable fabric adapted to bind with and upon the inner annular cone-shaped surfaces of the friction members, and that the mechanism may be lubricated in any suitable or desirable manner.

It will be obvious that slight variations may be made in the exact details of the construction hereinbefore referred to without departing from the spirit of my invention.

What I claim and desire to secure by Letters Patent is:—

1. A multiple cone clutch comprising a casing having an inner cone face, a friction member within said casing having an inner and an outer cone face inclined in opposite directions, a friction member yieldingly supported within and by the first named member having a peripheral cone face, all of said cone faces being in horizontal alinement when in clutched position, and means for relatively shifting the said friction members.

2. A multiple cone clutch comprising a casing having an inner cone face, a friction member within said casing having an inner and an outer cone face inclined in opposite directions, a friction member yieldingly supported within the first named member having a peripheral cone face, depending bolts secured to the casing for supporting the last named member, all of said cone faces being in horizontal alinement when in clutched position, and means for relatively shifting the said friction members.

3. A multiple cone clutch comprising a casing having an inner cone face, a friction member within said casing provided at its peripheral portion with two cone faces, each face inclined in an opposite direction, a friction member yieldingly supported within the first named member having a peripheral cone face and provided with a series of inwardly extending projections, each projection having an opening therethrough, bolts carried by said casing, each bolt passing through an opening in the last named member and adapted to support said member, and means for relatively shifting the said friction members.

4. A multiple cone clutch comprising a casing having an inner cone face, a friction member within said casing provided at its peripheral portion with two cone faces, each face inclined in an opposite direction, a friction member yieldingly supported within the first named member having a peripheral cone face and provided with a series of inwardly extending projections, each projection having an opening therethrough and an upturned inner terminal, a spring resting on said projections and in contact with the upper inner surface of the casing, bolts carried by the casing for supporting the last named member, and means for relatively shifting the said friction members.

5. A multiple cone clutch comprising a casing having an inner cone face, a friction member within said casing provided at its peripheral portion with two cone faces, each face inclined in an opposite direction, a friction member yieldingly supported within the first named member having a peripheral cone face and provided with a series of inwardly extending projections, each projection having an opening therethrough and an upturned inner terminal, a spring seated on said projections and in contact with the upper inner surface of the casing, headed depending bolts secured to the casing, each bolt passing through an opening in the last named member and adapted to limit the inward movement of said member, and means for relatively shifting the said friction members.

6. A multiple cone clutch comprising a casing having an inner cone face, a friction member within said casing provided at its peripheral portion with two cone faces, each face inclined in an opposite direction, and having inner depending walls forming a chamber, a spring located within said chamber for holding the parts clutched, a friction member yieldingly supported within the first named member having a peripheral cone face and provided with a series of inward extensions, and depending bolts carried by the casing for supporting said last named member.

7. A multiple cone clutch comprising a casing having an inner cone face, a friction member within said casing provided at its peripheral portion with two cone faces, each face inclined in an opposite direction, and having inner depending walls forming a chamber, a spring located within said chamber to hold the parts clutched, a friction member yieldingly supported within the first named member having a peripheral cone face and provided with a series of inward extensions with upturned terminals, a spring seated on said extensions and in contact with the upper inner surface of the casing, and headed depending bolts secured to the casing adapted to support the last named member and limit its inward movement.

8. A multiple cone clutch comprising a casing having an inner cone face having a series of elongated depressions therein and a series of projections thereon, friction material secured thereto forming a roughened surface, a friction member within the casing provided at its peripheral portion with two cone faces, each face inclined in an opposite direction and one of said faces having a series of elongated depressions therein and a series of projections thereon, friction material secured to the last named face forming a roughened surface, a friction member yieldingly supported within the first named member provided with a peripheral cone face, and means for relatively shifting the said friction members.

9. A multiple cone clutch comprising a casing having an inner cone face, a friction member within said casing provided at its peripheral portion with two cone faces, each face inclined in an opposite direction and having inner depending walls forming a chamber, a spring within said chamber for exerting an outward pressure against said member for clutching the parts, a friction member supported within the first named member provided with a peripheral cone face and having a spring seated thereon for exerting an inward pressure, all of said cone faces being in alinement when the parts are in clutched position.

In testimony whereof I affix my signature in the presence of two witnesses.

HARRY D. ABERNETHY.

Witnesses:
MYRON K. FORD,
KEEMETTO R. KING.